(12) United States Patent
Kempen et al.

(10) Patent No.: US 11,878,347 B2
(45) Date of Patent: Jan. 23, 2024

(54) IMPELLER AND TURBOCOMPRESSOR EQUIPPED WITH SUCH IMPELLER AND METHOD FOR MANUFACTURING SUCH AN IMPELLER

(71) Applicant: ATLAS COPCO AIRPOWER, NAAMLOZE VENNOOTSCHAP, Wilrijk (BE)

(72) Inventors: Karolien Kempen, Wilrijk (BE); Hilde De Gersem, Wilrijk (BE); Guy De Greef, Wilrijk (BE)

(73) Assignee: ATLAS COPCO AIRPOWER, NAAMLOZE VENNOOTSCHAP, Wilrijk (BE)

( * ) Notice: Subject to any disclaimer, the term of this patent is extended or adjusted under 35 U.S.C. 154(b) by 370 days.

(21) Appl. No.: 17/418,109

(22) PCT Filed: Nov. 26, 2019

(86) PCT No.: PCT/IB2019/060167
§ 371 (c)(1),
(2) Date: Jun. 24, 2021

(87) PCT Pub. No.: WO2020/136473
PCT Pub. Date: Jul. 2, 2020

(65) Prior Publication Data
US 2022/0112900 A1    Apr. 14, 2022

(30) Foreign Application Priority Data

Dec. 27, 2018 (BE) .................................. 2018/5957
Aug. 9, 2019 (BE) .................................. 2019/5517

(51) Int. Cl.
*B22F 10/28* (2021.01)
*B33Y 10/00* (2015.01)
(Continued)

(52) U.S. Cl.
CPC ............ *B22F 10/28* (2021.01); *B22F 5/04* (2013.01); *B22F 10/25* (2021.01); *B22F 10/68* (2021.01);
(Continued)

(58) Field of Classification Search
CPC .... B22F 3/105; B22F 5/00; B22F 5/04; B22F 10/00; B22F 10/25; B22F 10/28;
(Continued)

(56) References Cited

U.S. PATENT DOCUMENTS 4,787,821 A    11/1988    Cruse et al.
7,281,901 B2   10/2007    Garman et al.
(Continued)

FOREIGN PATENT DOCUMENTS

DE    102013221990 A1    4/2015
DE    102016217349 A1    3/2018
(Continued)

OTHER PUBLICATIONS

International Search Report and Written Opinion from PCT Application No. dated Feb. 11, 2020.
(Continued)

*Primary Examiner* — Mark A Laurenzi
*Assistant Examiner* — Dapinder Singh
(74) *Attorney, Agent, or Firm* — Workman Nydegger

(57) ABSTRACT

An impeller includes a central shaft or a tube for mounting on a shaft; around the shaft or tube a hollow hub, which in the direction from one end to the other end increases in diameter. The hub possesses an outside and an inside oriented towards the shaft or tube; a back wall which is provided at the end of the hub with the largest diameter perpendicular to the shaft or tube which at least partially closes the hollow space of the hub; a series of blades that are attached to the outside of the hub by their base; wherein a
(Continued)

number of flat, straight reinforcing ribs are provided which extend on the shaft or tube in an essentially radial direction and form a radial connection between the shaft or tube and the inside of the hub.

21 Claims, 2 Drawing Sheets

(51) Int. Cl.
*B33Y 80/00* (2015.01)
*B33Y 40/20* (2020.01)
*B22F 10/68* (2021.01)
*B22F 5/04* (2006.01)
*F04D 29/28* (2006.01)
*B22F 10/25* (2021.01)

(52) U.S. Cl.
CPC ............... *B33Y 10/00* (2014.12); *B33Y 40/20* (2020.01); *B33Y 80/00* (2014.12); *F04D 29/284* (2013.01)

(58) Field of Classification Search
CPC ......... B22F 10/68; B33Y 10/00; B33Y 40/20; B33Y 80/00; C23C 24/10; C23C 24/103; F04D 29/02; F04D 29/023; F04D 29/28; F04D 29/284; F04D 29/30; Y02P 10/25
See application file for complete search history.

(56) References Cited

U.S. PATENT DOCUMENTS

| | | | |
|---|---|---|---|
| 10,443,387 B2 * | 10/2019 | Mohamed | F01D 5/048 |
| 11,098,728 B2 * | 8/2021 | Pulnikov | F04D 29/266 |
| 11,713,769 B2 * | 8/2023 | Greenfield | F04D 29/2255 |
| | | | 416/186 R |
| 2005/0111971 A1 * | 5/2005 | Fukizawa | F04D 29/284 |
| | | | 415/204 |
| 2006/0140767 A1 | 6/2006 | Garman et al. | |
| 2010/0098546 A1 | 4/2010 | Emmerson et al. | |
| 2013/0216377 A1 * | 8/2013 | Wang | F04D 29/102 |
| | | | 415/230 |
| 2015/0267543 A1 | 9/2015 | Gerber et al. | |
| 2016/0290352 A1 | 10/2016 | Hayamitsu | |

FOREIGN PATENT DOCUMENTS

| | | |
|---|---|---|
| GB | 1515296 A | 6/1978 |
| GB | 2058941 A | 4/1981 |
| JP | 5620705 B2 | 11/2014 |
| JP | 2016191310 A | 11/2016 |
| WO | 2016127225 A1 | 8/2016 |

OTHER PUBLICATIONS

Belgian Search Report from corresponding BE Application No. dated Aug. 15, 2019.
International Preliminary Report on Patentability from PCT Application No. dated Nov. 19, 2020.

* cited by examiner

IMPELLER AND TURBOCOMPRESSOR EQUIPPED WITH SUCH IMPELLER AND METHOD FOR MANUFACTURING SUCH AN IMPELLER

BACKGROUND

The present invention relates to an impeller, for example an impeller for a centrifugal machine such as a turbocompressor, turbine or the like.

A centrifugal compressor element as used in turbocompressors exists as is known from an impeller that is rotatably mounted in a housing with an axial inlet and a radial outlet, whereby the impeller is formed by a sort of solid trumpet-shaped hub to bend the gas drawn in at the inlet from the axial direction to the radial direction at the outlet and by blades mounted on the hub which together with the hub and the housing define narrowing channels through which the gas is guided to compress it.

The impeller is provided with a central borehole to be able to attach the impeller to a drive shaft.

It is known that such impeller is driven at high speeds of several tens of thousands of revolutions per minute, whereby the linear peripheral velocity at the outlet of the impeller can reach several hundreds of metres per second.

The huge centrifugal forces that occur in such high speeds generate massive stresses in the material of the impeller.

However, these stresses in an impeller with a completely solid hub are distributed very unevenly. The stress field on the impeller is a combination of stresses in different directions, which are typically multi-axially oriented, i.e. according to different axes. At the level of the back of the hub, i.e. at the end of the hub with the largest diameter, the stresses are mainly in the radial direction and in the circumferential direction. These two stress components are a result of the centrifugal forces.

The axial stresses on the back of the hub are a second-order effect. The axial stresses are important for the central borehole, because the impeller is tensioned in axial direction on a shaft using a tensile bolt.

Depending on the geometry of the impeller, the stress gradient may vary, but the largest section of the impeller is underloaded by stresses that are far below the elastic limit of the material from which the impeller is made, the disadvantage being an inefficient use of this material and an unnecessary high mass of the impeller.

Nevertheless, the reduction of the mass of the impeller is important to keep the natural bending frequency of the drive shaft on which the impeller is mounted sufficiently high to enable higher speeds of the impeller, which is in itself useful for the energy-efficient operation of a turbocompressor.

Also, by reducing the mass of the impeller the high stresses as a result of the centrifugal forces, both on the central borehole, on the back of the hub and on the rounding at the level of the back-hub transition, will be limited.

With a lower mass of the impeller the bearings of the drive shaft are less loaded, such that by design smaller bearings can be selected in turbo compressors resulting in a lower cost price and/or a more compact compressor element or a drive shaft of a smaller diameter.

Solutions to reduce the mass of the impeller are already known, for example by applying a metal grid structure in a central section of the hub as disclosed in WO 2013/124314, but this is less able to absorb the radially oriented centrifugal forces, such that the grid structure is unnecessarily strong and rigid in unloaded directions, resulting in a certain weight disadvantage.

Another solution is to provide a hollow hub with internal reinforcements as disclosed in U.S. Pat. No. 7,281,901.

They are aimed mainly at reducing the inertia and are unsuitable to uniformly distribute the stresses in the impeller, which will result in the occurrence of stress concentrations.

WO 2016/127225 discloses an internal structure of the impeller, consisting of a hollow hub with reinforcing ribs which are specifically aimed at absorbing the radial centrifugal forces, such that the stresses that are generated can flow into the hub.

The reinforcing ribs extend from the hub, on the level of the base of the blades, to the shaft or tube and form radial spokes, so to speak. The reinforcing ribs hereby follow the curve of the blades and are thus themselves also curved, both in height and in length in order to be able to thus absorb centrifugal forces.

Although such impeller is better at absorbing the centrifugal forces, it remains necessary to make the hub and/or reinforcing ribs thicker in certain places to be able to absorb the stresses.

Due to the design of such impeller it needs to be manufactured by means of an additive production method.

Preferably, powder bed fusion is used for this, whereby thermal energy is utilised to selectively enable certain regions in a powder bed to fuse together, which will allow all the details to be 'printed' with the necessary precision.

A property of such additive production method is that the surface roughness of the produced structure will depend on the slope of the structure in question: the straighter the structure the flatter or smoother the surface.

In the impeller of WO 2016/127225 the reinforcing ribs comprise sloping structures, such that they are relatively rough. This has very adverse effects for the fatigue.

Moreover, the curved reinforcing ribs will define cavities with a relatively complex form in the hollow hub, such that it is difficult to remove the remaining unfused powder from these cavities.

Consequently, two passages or holes must be provided per chamber to be able to blow out and remove the powder via these holes.

These holes are of course detrimental for the strength or rigidity of the impeller, as well as for the fatigue.

Therefore, there is still a need of an impeller structure with a better utilisation of the material and a smaller mass, in which the centrifugal forces and the axial tensioning forces are optimally absorbed and which can be made easily and precisely via an additive production method.

The purpose of the present invention is to provide a solution for one or more of the aforementioned and other disadvantages relating to known designs of an impeller as disclosed in the aforementioned WO 2013/124314, the U.S. Pat. No. 7,281,901 and the WO 2016/127225.

SUMMARY

To this end, the invention relates to an impeller, comprising:
 a central shaft or a tube for mounting on a shaft;
 around the shaft or tube a hollow hub which in the direction of one end to the other end increases in diameter, said hub possessing an outside and an inside oriented towards the shaft or tube;
 a back wall which is provided at the end of the hub with the largest diameter perpendicular to the shaft or tube which at least partially closes the hollow space of the hub;

a series of blades that are attached to the outside of the hub by their base;

wherein a number of flat, straight reinforcing ribs are provided which extend on the shaft or tube in an essentially radial direction and form a radial connection between the shaft or tube and the inside of the hub, wherein the impeller is provided with at least one polygon or ring connecting all reinforcing ribs with each other and which is concentric with the central shaft or tube, characterised in that said ring or polygon is provided with passages, whereby at least one passage is always provided in the section of the ring or polygon located between two reinforcing ribs.

The 'essentially radial direction' in which the reinforcing ribs extend means that the angle between the radial reinforcing ribs and the geometric centreline of the central shaft or tube of the impeller is maximum 10 degrees, and better still maximum 7 degrees and preferably maximum 5 degrees.

This provides the advantage that such impeller, as is the case in WO 2016/127225, will be very light due to its hollow structure such that the impeller will be able to rotate at a very high speed. In this way the turbocompressor in which the impeller is provided will be able to supply more compressed air.

Another advantage is that due to the orientation of the reinforcing ribs the internal structure is much more rigid, such that centrifugal forces will be absorbed better by the straight reinforcing ribs than in WO 2016/127225 with the curved reinforcing ribs. The consequence or advantage of this is that the hub or the reinforcing ribs do not have to be made thicker in certain locations to absorb the stresses occurring there.

Moreover, the reinforcing ribs will also extend axially in a straight or flat direction, such that the impeller is also better at absorbing forces in the axial direction. Indeed, due to the tensioning with a tension bolt in an axial direction, the impeller is compressed when being mounted in a turbomachine. Due to the internal structure with the flat, straight reinforcing ribs, this print is absorbed better, such that less stresses are created in the impeller.

Yet another advantage is that in the manufacture only upstanding structures need to be printed for the reinforcing ribs. Consequently, the surface will be smoother, such that less fatigue will occur.

An added advantage is that the chambers that are created by the reinforcing ribs have a simpler shape, such that the removal of the powder from these chambers after printing will be easier. Only one hole will have to be provided to remove the powder.

Preferably, the number of reinforcing ribs is in proportion to the number of blades.

This will make sure the impeller is cyclical-symmetric, which means it will comprise a number of sections which repeat themselves.

In this way the weight will also be distributed in a cyclical-symmetric way, which is necessary for the balancing of the impeller.

In a practical embodiment, the impeller is provided with at least one polygon or ring connecting all reinforcing ribs with each other and which is concentric with the central shaft or tube.

Due to this polygon or ring the space between two consecutive radial reinforcing ribs is divided into two so-called chambers.

The polygon or ring will make the impeller mechanically stronger and more resistant to deformation.

It is known that for an impeller the deformation must be limited, i.e. typically less than a few tenths of a millimetre.

According to a preferred characteristic of the invention the attachments between the reinforcing ribs and possibly the at least one polygon or ring with the rest of the impeller are rounded.

By rounding all internal edges, sides and corners which are created, among others, by the reinforcing ribs and the polygon or ring, fatigue will be reduced to a minimum.

The invention also relates to a turbocompressor, characterised in that it is provided with an impeller according to the invention.

The advantages of such turbocompressor are directly related to the advantages of the impeller according to the invention.

Thus, the turbocompressor will be able to rotate at a higher speed compared to a turbocompressor with a known, traditional solid impeller, such that more compressed air can be supplied.

The invention also relates to a method for manufacturing an impeller, said method comprising the following steps:
  providing a central shaft or a tube for mounting on a shaft;
  providing a hollow hub around the shaft or tube which in the direction from one end to the other end increases in diameter, said hub possessing an outside and an inside oriented towards the shaft or tube;
  providing a back wall which is provided at the end of the hub with the largest diameter perpendicular to the shaft or tube which at least partially closes the hollow space of the hub;
  providing a series of blades that are attached to the outside of the hub by their base,
whereby the method further comprises the step of providing a number of flat, straight reinforcing ribs which extend on the shaft or tube in an essentially radial direction and form a radial connection between the shaft or tube and the inside of the hub.

In particular the invention relates to a method whereby said steps are executed by means of an additive production method.

BRIEF DESCRIPTION OF THE DRAWINGS

With the intention of better showing the characteristics of the invention, a few preferred embodiments of an impeller according to the invention and a turbocompressor equipped with it are described by way of an example without any limiting nature, with reference to the accompanying drawings, wherein:

FIG. 3 shows a cross-section according to the plane III-III in FIG. 1;

DETAILED DESCRIPTION OF VARIOUS EMBODIMENTS

The impeller 1 shown in the FIGS. 1 to 4 is an impeller of a turbocompressor by way of example.

Figure 1:
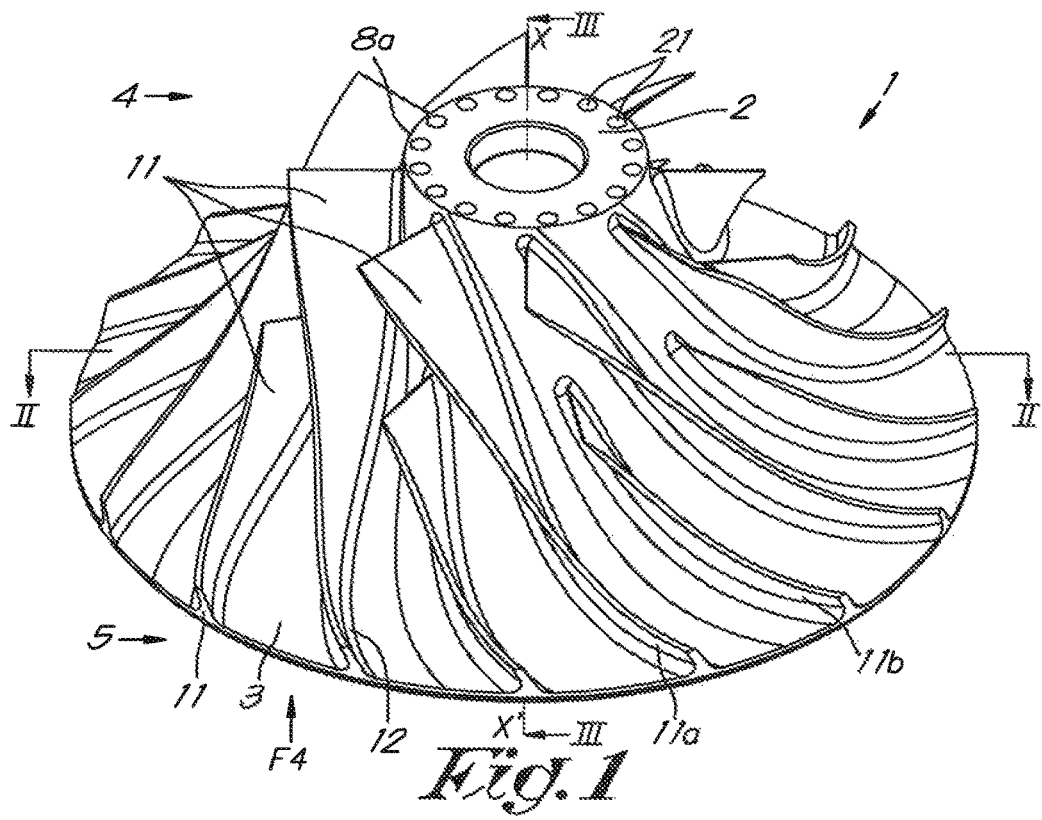
FIG. 1 schematically shows a perspective view of an impeller according to the invention.
Figure 2:
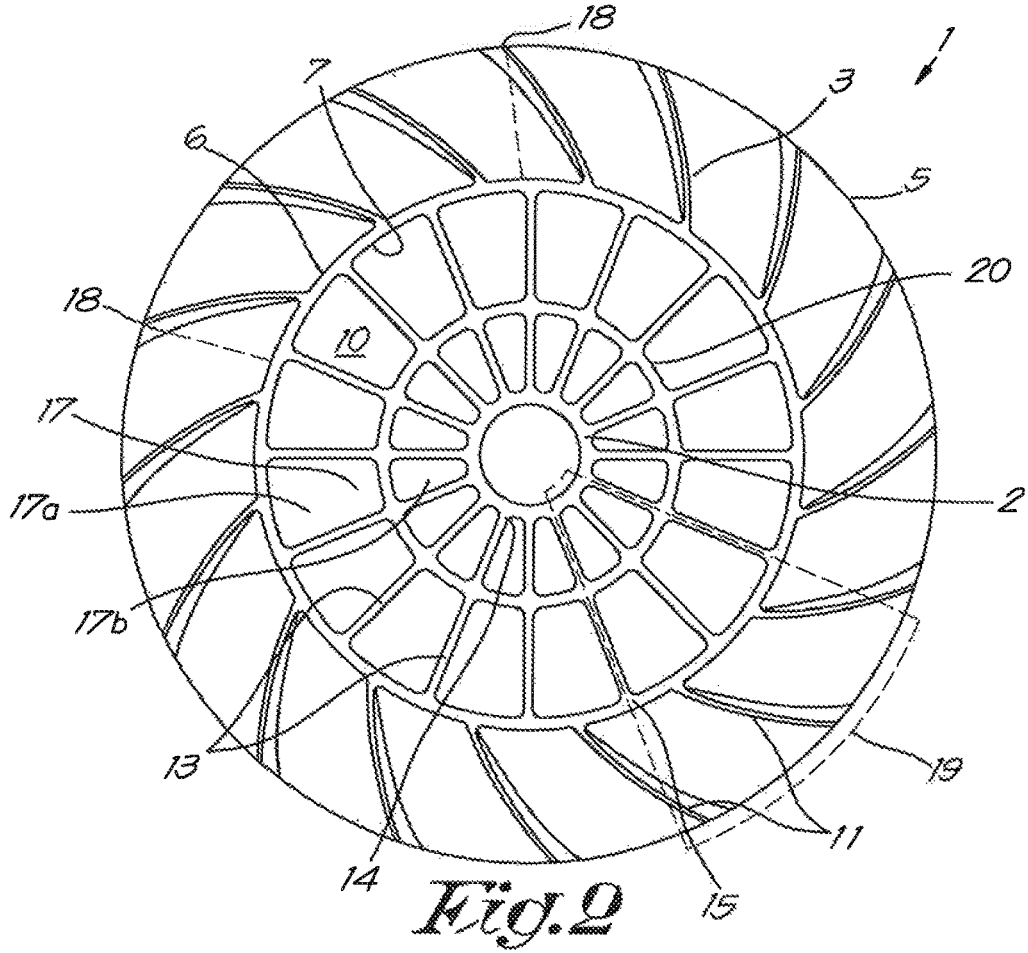
FIG. 2 shows a cross-section according to the plane II-II in FIG. 1.
Figure 5:
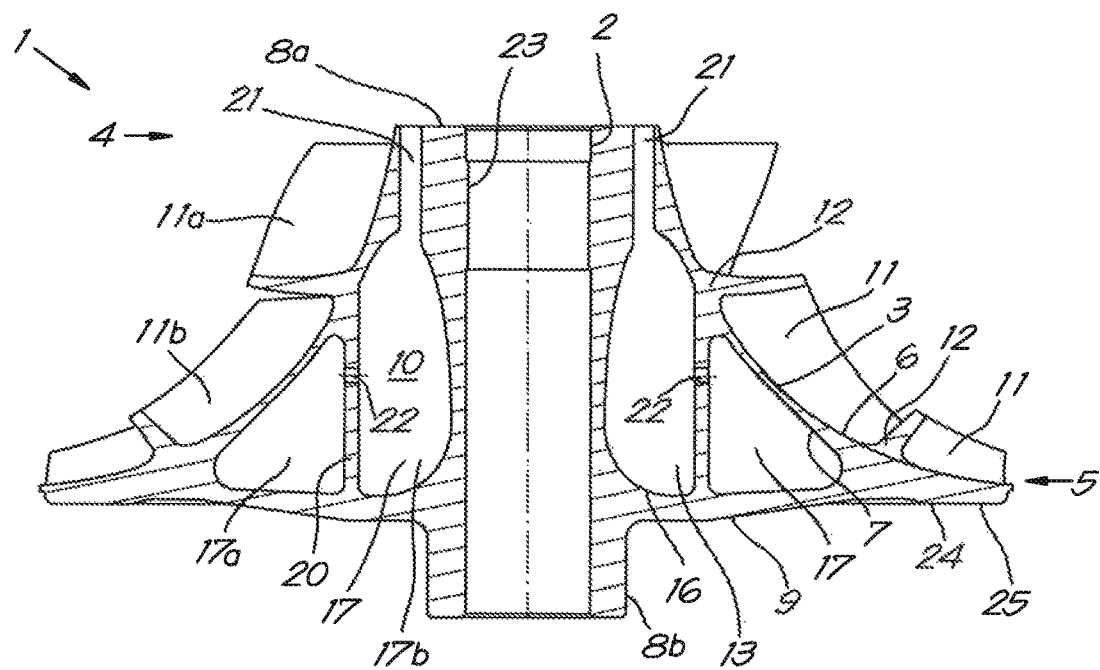

The impeller 1 according to the invention, as shown in FIG. 1, is very similar in terms of external design to a traditionally known impeller.

The impeller 1 contains a central tube 2 with which the impeller 1 can be mounted on a drive shaft (not shown in the figures) in order to be driven around the geometric centreline X-X' of the tube 2 in the housing of, for example, a compressor element.

Instead of a central tube 2, the impeller 1 can also be provided with a solid shaft which can be coupled to said drive shaft.

The impeller 1 further comprises a trumpet-shaped hub 3 extending around the tube 2, which in the direction from one end 4 to the other end 5 increases in diameter.

According to the invention the hub 3 is a hollow hub 3 with an outside 6 and an inside 7 oriented toward the tube 2. This is visible in FIGS. 2 and 3.

The hub 3 connects to on one end 8a of the central tube 2 with the end 4 with the smallest diameter. This end 4 is also called the axial end of the hub 3.

Figure 4:
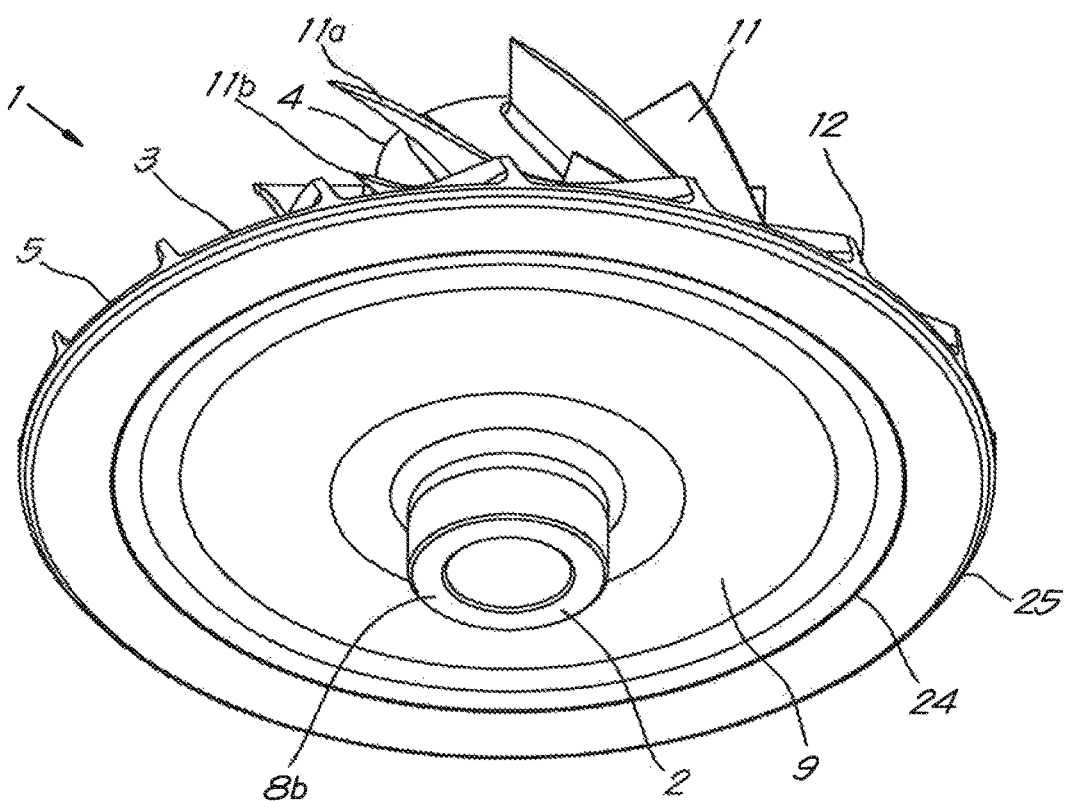
FIG. 4 shows the view according to the arrow F4 from FIG. 1.

The hub 3 connects to a back wall 9 with the end 5 with the largest diameter, which is visible in FIGS. 3 and 4. This end 5 is also called the radial end of the hub 3.

This essentially disk-shaped back wall 9, on the level of the other end 8b of the central tube 2, extends perpendicularly to the tube 2 and will close or enclose the hollow space 10 between the hub 3, the tube 2 and the back wall 9.

The outside 6 or the outer surface of the hub 3 changes in a sloping way from an essentially axial direction X-X' at the end 4 with the smallest diameter to an essentially radial direction at the end 5 with the largest diameter. This slope is visible in FIG. 3.

On the hub 3 a series of curved blades 11 is attached, which are affixed with their base 12 on said outside 6 of the hub 3.

In the example shown, two series of blades are provided, i.e. main blades 11a, on the one hand, which extend over a certain length from the axially oriented end 4 of the hub 3 to the radially oriented end 5 of the hub 3, and splitter blades 11b on the other hand, which extend between the main blades 11a over a shorter length, starting at an axial distance from the end 4 of the hub 3 to the end 5 of the hub 3.

However, the invention is not limited to two series of blades 11, but is also applicable to any number of series of blades 11, whereby for example no splitter blades 11b are present or on the contrary a number of series of splitter blades 11b can be provided.

According to the invention, in the hollow space 10 of the hub 3, flat, straight reinforcing ribs 13 are provided, which extend on the tube 2 in radial direction and form a radial connection between the tube 2 and the inside 7 of the hub 3.

The reinforcing ribs 13 are connected with their base 14 to the tube 2 and with their head 15 to the inside 7 of the hub 3.

In this case, the reinforcing ribs 13 extend from the back wall 9 to the end 4 of the hub 3 with the smallest diameter, as shown in FIG. 3. In other words, the reinforcing ribs 13 are connected directly to the back wall 9 along an edge 16 over their height.

The reinforcing ribs 13 will divide the hollow space 10 into a number of chambers 17.

In this case the geometric plane of the reinforcing ribs 13 will intersect with the tip 18 of the blades 11 on the end 5 of the hub 3 with the largest diameter.

The geometric plane also refers to the geometric or imaginary extension of the reinforcing ribs 13.

In this way the reinforcing ribs 13 are located in the direction of the largest centrifugal force, such that they can absorb the centrifugal force optimally.

Moreover, the geometric centreline X-X' of the central tube 2 coincides with the geometric plane of the reinforcing ribs 13. This means that the angle between the reinforcing ribs 13 and the geometric centreline X-X' of the central shaft 2 is zero degrees. This is not necessary for the invention, but this angle is maximum ten degrees according to the invention and preferably maximum seven degrees and even more preferable maximum five degrees.

The number of reinforcing ribs 13 is not restrictive for the invention and will depend, among others, on the dimensions of the impeller 1. Typically, a larger impeller 1 will require more reinforcing ribs 13, as it will be subject to greater centrifugal forces due to its dimensions.

However, preferably the number of reinforcing ribs 13 is always in proportion to the number of blades 11.

This means, when there are eight main blades 11a and eight splitter blades 11b, for example, there are sixteen reinforcing ribs 13. This is also the case in the example shown.

For example, it is also possible that thirty-two reinforcing ribs 13 are provided. Moreover, it is also not excluded that the number of reinforcing ribs 13 is in proportion to the number of main blades 11a, such that it is also possible only eight reinforcing ribs 13 are provided.

The foregoing will ensure that a cyclical-symmetrical structure is obtained, whereby the impeller 1 comprises a number of sections 19, in the example of the figures eight sections, which are repeated every time.

The reinforcing ribs 13 are primarily under a tensile load, whereby the entire mass of the reinforcing ribs 13 is used to divert a part of the stresses from the hub 3 to the tube 2 and also to the back wall 9 if necessary, and there is thus no, or practically no, dead mass, in other words unloaded mass, in the hollow space 10 of the hub 3 which does not contribute to the strength of the impeller 1 in the radial direction.

In this case, but not necessarily in, for example, smaller impellers 1, the impeller 1 is provided with one ring 20 connecting all reinforcing ribs 13 with each other.

It could also be more than one ring 20.

Moreover, instead of a ring 20 one or several polygons or a combination of polygon and circle 20 could be applied.

In order to preserve the cyclical symmetry, said ring 20 is concentric with the central tube 2.

The ring 20 will subdivide each chamber 17 into two subchambers 17a, 17b.

The ring 20 will provide sturdiness or mechanical strength and counter deformation.

It is indeed important that the impeller 1 does not deform too much. Indeed, the inward deformation may not be too big, in order to counter air and air pressure losses. The outward deformation is also crucial, as there is a housing around the impeller 1, whereby the rotating impeller 1 must never touch this housing and other stationary components of the compressor element.

As shown in the figures, the attachments between the reinforcing ribs 13 and the at least one concentric polygon or ring 20 with the rest of the impeller 1 are rounded.

This means that all internal edges, sides and corners are rounded. This is important to avoid stress concentrations.

This will also be necessary when the impeller 1 is manufactured by means of an additive production method.

Additive production refers to a category of production methods, for example powder bed fusion whereby thermal energy is utilised to selectively fuse together certain regions in a powder bed, or direct energy deposition whereby beamed thermal energy is used to melt materials while they are deposited.

Within the category of powder bed fusion there are a number of technologies such as electron beam melting, whereby powder material is melted using an electron beam; selective laser melting whereby powder material is melted by means of a laser; selective laser sintering whereby powder material is sintered using a laser. The category of direct energy deposition includes the technology of laser cladding.

In such production methods based on powder bed fusion it is important there are no structures with too big a slope, such that in some cases, corners must be rounded in order to avoid such slopes.

Another consequence of such production method is that the hollow internal space and (sub)chambers 17, 17*a*, 17*b* must be connected with the environment, in order to be able to remove the remaining powder.

In this case, powder will remain in the chambers 17 and subchambers 17*a*, 17*b* during the manufacture of the screw rotor 1 by means of powder bed fusion.

That is why in the example shown the central tube 2 is provided with holes 21 which extend in the axial direction and which form a connection between the hollow space 10 of the hub 3 and the environment.

Said ring 20 is also provided with passages 22, whereby at least one passage 22 is always provided in the section of the ring 20 located between two reinforcing ribs 13.

Preferably these holes 21 and passages 22 are already provided during the production process.

Via said holes 21 and passages 22 the powder will be able to leave the (sub)chambers.

Due to the straight and flat form of the reinforcing ribs 13 and the straight form of the ring 20 the powder can be simply removed by shaking the impeller 1.

After the impeller 1 has been manufactured and the remaining powder is removed, every impeller 1 is balanced. This means that the impeller 1 is measured or weighed and that material is removed or added in certain locations until the impeller 1 is balanced, this means: the weight is distributed (cyclically-)symmetrically. This is very important for the functioning of the impeller 1, as the smallest imbalance can result in adverse effects due to unwanted stresses and vibrations.

When cyclical-symmetric is referred to in this context, it must be noted that perfect cyclical-symmetry is very difficult to achieve in practice. That is why in the current text this needs to be interpreted as "practically cyclical-symmetric", which in this context corresponds with a maximum distance between the geometric centreline of the central shaft on the one hand and the intersection of the reinforcing ribs with the back wall on the other hand, which is 10% of the height of the impeller.

To allow the impeller 1 to approximate cyclical-symmetry as much as is practically realisable, additional material can be provided in a number of locations in the impeller 1, which can be used later to balance the impeller 1 by removing material locally.

As shown in FIGS. 3 and 4, the impeller 1 shows a local thickening 23 of the central tube 2 on the level of the end 8*a* of the tube 2.

This local thickening 23 can be executed as a solid ring at the end 8*a* of the tube 2, whereby material can be removed from this ring, for example by drilling holes.

The impeller 1 shows a local thickening 24 of the back wall 9 on the level of the outer edge 25.

In other words, this thickening 24 is located at the location where the end 4 of the hub 3 with the largest diameter makes contact with the back wall 9.

Material can also be removed at this location for balancing, for example by milling or grinding.

As already mentioned, instead of on a tube 2 this can also be applied on a solid haft, in which holes 21 may or may not be provided to remove powder from the space.

The present invention is by no means limited to the embodiments described as an example and shown in the drawings, but an impeller according to the invention and a turbocompressor equipped therewith can be realised in all kinds of forms and dimensions, without departing from the scope of the invention.

The invention claimed is:

1. An impeller containing:
    a central shaft or a tube for mounting on a shaft;
    around the shaft or tube a hollow hub which in a direction from one end to the other end increases in diameter, said hub possessing an outside and an inside oriented towards the shaft or tube;
    a back wall which is provided at an end of the hub with the largest diameter perpendicular to the shaft or tube which at least partially closes the hollow space of the hub;
    a series of blades that are attached to the outside of the hub by their base;
    wherein a number of flat, straight reinforcing ribs are provided which extend on the shaft or tube in an essentially radial direction and form a radial connection between the shaft or tube and the inside of the hub,
    wherein the impeller is provided with at least one polygon or ring connecting all reinforcing ribs with each other and which is concentric with the central shaft or tube,
    wherein said ring or polygon is provided with passages,
    wherein at least one passage is always provided in a section of the ring or polygon located between two reinforcing ribs.

2. The impeller according to claim 1, wherein a geometric plane of the reinforcing ribs intersects with a tip of the blades at the end of the hub with the largest diameter.

3. The impeller according to claim 1, wherein the geometric centreline of the central shaft or tube coincides with a plane of the reinforcing ribs.

4. The impeller according to claim 1, wherein the number of reinforcing ribs is in proportion to the number of blades.

5. The impeller according to claim 1, wherein the tube or central shaft is provided with holes which extend in an axial direction, and which form a connection between the hollow space of the hub and the environment.

6. The impeller according to claim 1, wherein the impeller shows a local thickening of the central shaft or tube on a level of the end of the tube located at the end of the hub with the smallest diameter.

7. The impeller according to claim 1, wherein the impeller shows a local thickening of the back wall on a level of the outer edge.

8. The impeller according to claim 1, wherein the reinforcing ribs are directly connected with the back wall.

9. The impeller according to claim 1, wherein attachments between the reinforcing ribs and the at least one concentric polygon or ring with the rest of the impeller are rounded.

10. A turbocompressor, wherein it is provided with an impeller according to claim 1.

11. A method for manufacturing an impeller, said method comprising the following steps:
    providing a central shaft or a tube for mounting on a shaft;
    providing a hollow hub around the shaft or tube which in a direction from one end to the other end increases in diameter, said hub possessing an outside and an inside oriented towards the shaft or tube;

providing a back wall which is provided at an end of the hub with the largest diameter perpendicular to the shaft or tube which at least partially closes the hollow space of the hub;

providing a series of blades that are attached to the outside of the hub by their base, wherein the method further comprises the step of providing a number of flat, straight reinforcing ribs which extend on the shaft or tube in an essentially radial direction and form a radial connection between the shaft or tube and the inside of the hub, wherein it further comprises the step of providing the impeller with at least one polygon or ring connecting all reinforcing ribs with each other, and which is concentric with the central shaft or tube, wherein the method further comprises the step of providing one or more passages during an additive production process, wherein at least one passage is always provided in a section of the polygon or ring located between two reinforcing ribs.

12. The method according to claim 11, wherein said steps are executed by means of the additive production process.

13. The according to claim 12, wherein for the additive production process a powder bed fusion method is applied to selectively fuse together certain regions in a powder bed.

14. The method according to claim 13, wherein the fusion step comprises the step of at least partially melting or sintering powder material by means of an electron beam or by means of a laser.

15. The method according to claim 12, wherein for the additive production process a direct energy deposition method is applied, wherein beamed thermal energy is used to allow materials to melt while they are deposited.

16. The method according to claim 15, wherein for the direct energy deposition method, laser cladding technology is applied.

17. The method according to 12, wherein it comprises the step of ensuring during the production process that all internal edges, sides and corners of the impeller are rounded.

18. The method according to claim 11, wherein the method further comprises the step of providing one or more holes in the central tube during the additive production process which form a connection between the hollow space of the hub and the environment.

19. The method according to the claim 18, wherein after the additive production process the method further comprises the step of shaking the impeller to remove excess powder material from the hollow space of the hub via the aforementioned one or more holes.

20. The method according to claim 19, wherein the method after removing the remaining powder, further comprises the step of balancing the impeller by removing or adding material in certain locations until the impeller is balanced.

21. The method according to claim 20, wherein it comprises the step of adding additional material during the additive production process for balancing purposes, which after the removal of the excessive powder, can be removed locally to balance the impeller.

* * * * *